Jan. 30, 1962 D. KRUEGER 3,018,566
MODULATOR DEVICE
Filed June 25, 1959 2 Sheets-Sheet 1
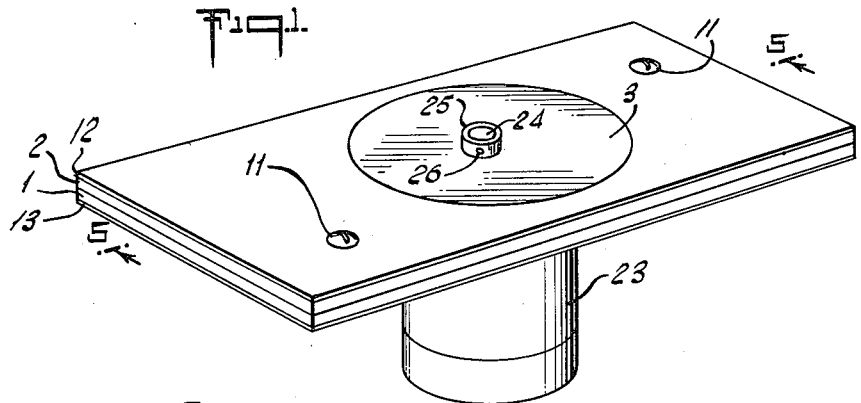
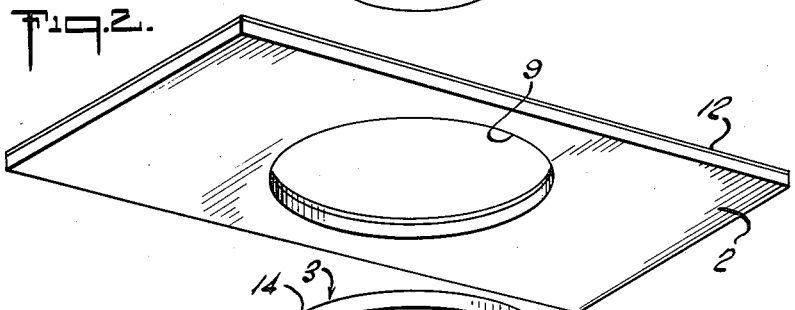
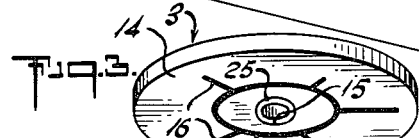
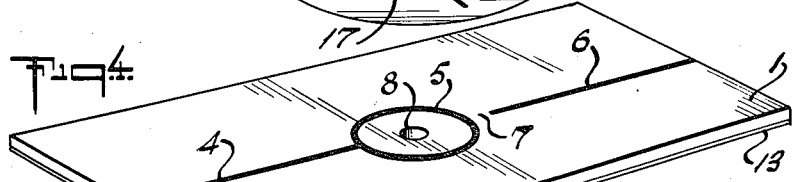
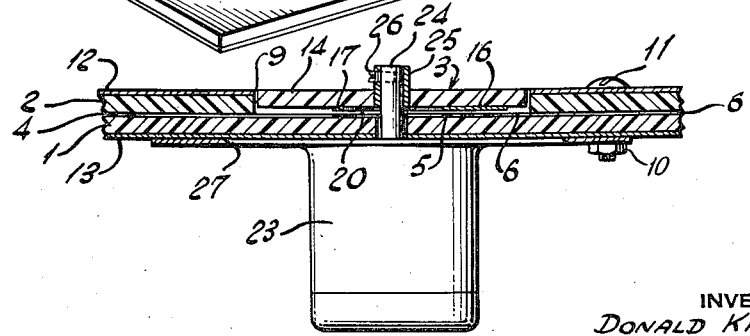
INVENTOR
DONALD KRUEGER
BY Mitchell & Bechert
ATTORNEY Jan. 30, 1962 D. KRUEGER 3,018,566
MODULATOR DEVICE
Filed June 25, 1959 2 Sheets-Sheet 2
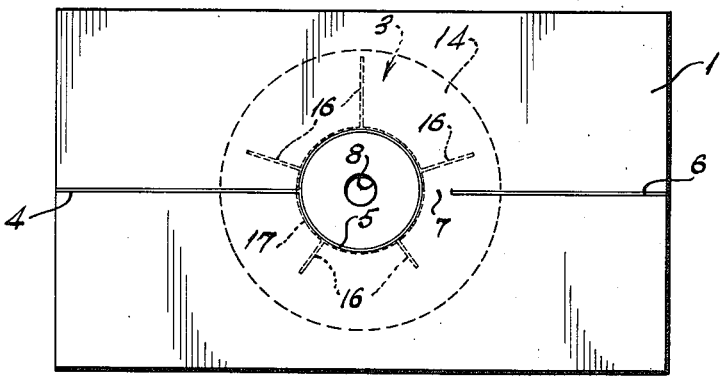
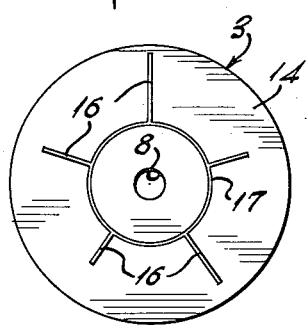 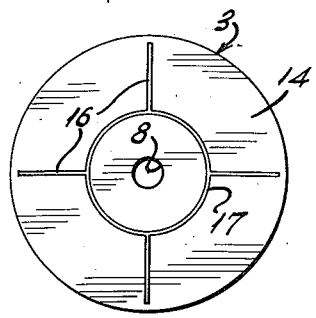
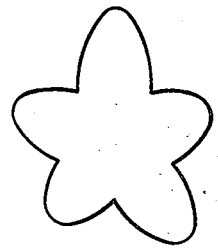 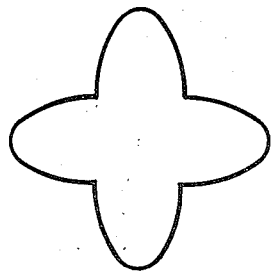
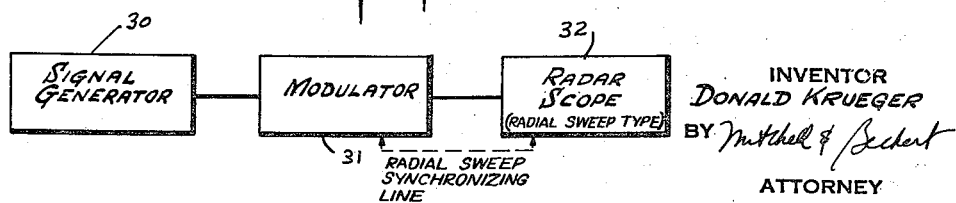
INVENTOR
DONALD KRUEGER
BY Mitchell & Bechert
ATTORNEY

United States Patent Office 3,018,566
Patented Jan. 30, 1962

3,018,566
MODULATOR DEVICE
Donald Krueger, State College, Pa., assignor to HRB-Singer, Inc., State College, Pa., a corporation of Delaware
Filed June 25, 1959, Ser. No. 822,850
9 Claims. (Cl. 35—10.4)

This invention relates to a modulator for use in a radar receiver and more particularly to an amplitude modulator employing a mechanically-driven element for simulating electronic emissions from an antenna or antenna array.

In training personnel in the use of specialized receiving apparatus, such as radar receivers, it is usual to simulate the transmitted signals. Conventionally, the simulated signals are in the form of radio-frequency (R-F) "bursts." These bursts approach a square-wave pattern as the R-F signal is compared with time. The antenna responses of the conventional simulators are produced electronically by applying a square wave to trigger an R-F oscillator, or by gating the R-F output of the oscillator.

These known simulators suffer two main disadvantages. First, the response shape of the R-F carrier does not simulate the response shape of an actual antenna, and secondly, the complex lobe structure of a typical antenna is absent from the simulator pattern.

It is, therefore, a primary object of the invention to overcome these disadvantages and to provide an improved signal simulator, which is capable of accurately simulating the response shape of an actual antenna including the complex lobe structure.

It is a further object of this invention to provide such a simulator for use with a radar receiving system, whereby equipment and personnel performance may be assessed, equipment and personnel technical requirements may be determined, and personnel training under simulated actual antenna response conditions made possible.

In accordance with an aspect of the invention, there is provided an amplitude modulator for use in a radar receiving system, comprising a discontinuous transmission line; one end constituting an input and the other end the output. The invention is characterized by a rotary member having a plurality of radially extending conducting segments and positioned so that each of the segments capacitively couples together the discontinuous transmission line in succession. The capacity is determined by the shape of the respective segments and the spacing between the transmission line and the segments. A simulated response pattern of an actual antenna, including the complex lobe structure, is produced by the varying coupling between the two ends of the transmission line.

The above-mentioned and other features and objects of this invention and the manner of attaining them will become more apparent and the invention itself will be best understood by reference to the following description of an embodiment of the invention taken in conjunction with the accompanying drawings, wherein:

FIGURE 1 is a perspective view of the modulator device of the present invention;

FIGURE 2 is a perspective view of the top plate portion of the modulator device;

FIGURE 3 is a perspective view of the rotor element portion of the modulator device;

FIGURE 4 is a perspective view of the bottom plate of the modulator device;

FIGURE 5 is a sectional view of the modulator taken on line 5—5 of FIGURE 1;

FIGURE 6 is a top plan view of the bottom plate portion of the modulator device with the relative position of the rotor element shown in phantom;

FIGURES 7 and 8 are top plan views of rotor elements; each of which has a conductor pattern formed thereon;

FIGURES 9 and 10 show the lobe structure of simulated antenna patterns as simulated by the rotor conductor patterns of FIGURES 7 and 8, respectively; and FIGURE 11 is a block diagram of a system utilizing such a modulator device for producing a simulated antenna pattern.

Generally, amplitude control of the R-F output is accomplished by a "variable capacitor technique" which controls the coupling to the output and also controls the discontinuities of the transmission line.

Referring now to the drawings, FIGURE 1 shows a preferred embodiment of the assembled modulator device of the present invention, and FIGURES 2, 3 and 4 illustrate the component parts of the device which are a bottom dielectric plate 1, a top dielectric plate 2 and a dielectric rotor element 3.

A discontinuous transmission line (FIG. 4) is mounted or imprinted on the dielectric plate 1. The line consists of a first conducting portion or plate 4 which terminates preferably in a conducting ring or plate 5 and a second conducting portion or plate 6 spaced from the first conducting portion or plate to define a gap 7. A shaft opening 8 is provided in the dielectric plate 1 and is disposed centrally of the ring 5 for a purpose to be hereinafter described.

The top dielectric plate 2 is formed with a circular opening 9 and is fixed in contact relationship with the bottom dielectric plate 1 so that the transmission line is sandwiched between the two plates. Bolt and nut assemblies 10 and 11 (FIG. 5) may be used to maintain the plates in their desired relationship. With the two plates so locked together, the opening 9 is concentric with the shaft hole 8 and circumscribes the annular conducting ring 5 formed on plate 1. The opening 9 is of a diameter to allow the terminal portion of conductor 6 to extend into the opening as shown in FIGURE 6.

The upper surface of the top plate 2 and the lower surface of the bottom plate 1 are plated with conductive sheets 12, 13, respectively, to complete the transmission line (except for the capacitive coupling) and reduce radiation losses.

As best seen in FIGURE 3, rotor element 3 is preferably circular in shape and consists of a dielectric disc 14, having a centrally located shaft bore 15; the disc having imprinted thereon a series of conductors or plate 16 of varying length and shape, extending in a radial manner from a conducting ring or plate 17. The lengths and shapes of the conductors imprinted on the disc, as well as the number of them and the relative spacial relationships between them, are such as to produce the specific pattern of the signal to be simulated. The number of conductors imprinted on the rotor indicates the number of lobes in the simulated pattern, while, the length and shape of each conductor provide the dynamic response characteristic for the corresponding lobe in the simulated pattern. The spacing between conductors determines the spacing between the lobes of the simulated pattern.

This effect is illustrated in FIGURES 7 to 10 wherein rotor conductor segment patterns are depicted with the corresponding lobe structures and response patterns of the signals. A rotor element, having five conductors of different lengths and relative spacings, is depicted in FIGURE 7. The corresponding simulated signal (FIGURE 9) has five lobes, each of which has a dynamic response which is in accord with the lengths of the conductors on the rotor element. The spacing between the lobes is the same as the spacing between the conductors. A second rotor element is depicted having four equally long and equally spaced conductors for producing a signal having four lobes which are equally spaced and of the same dynamic response (FIGURES 8 and 10). This simulated signal effect is accomplished by continuously sweeping the conductor elements of the rotor past the second conductor of the transmission line in a manner to be described.

Referring again to the assembled modulator device of FIGURE 1 and the sectional view of FIGURE 5, the rotor element 3 is positioned over the dielectric plate 1 and within the opening 9 of the top dielectric plate 2 such that, the rings 5 and 17 provide continuous electrical coupling. The element 3 is mounted so as to leave a dielectric gap 20 between the rotor element and the second conductors 4, 6.

The capacitance is determined by the dielectric gap 20 (FIGURE 5) between the conducting surfaces, the mutual area of the conducting surfaces and the dielectric material in the gap. As the rotor is driven, the mutual conducting area changes, thereby producing changes in the coupling between the input and output. Although the dielectric material and the dielectric gap do not vary in the operation of the device, either or both can be selected to produce wide ranges in capacity, depending upon the application of the device.

Power means in the form of a motor 23 drives a shaft 24 to which the rotor element 3 is fixed over a bushing 25. A set screw 26 holds the rotor against angular slippage on the shaft.

The previously mentioned nut and bolt assemblies 10 and 11 may also secure a motor drive plate 27 to the assembled modulator device as shown. It is evident that the motor 23, in addition to providing the power to drive the rotor element 3 also controls the frequency of modulation, since this frequency is dependent on the rate at which rotor conductor segments sweep over conductor 6.

The basic components of a radar receiving system are shown in FIGURE 11 by block diagram. A signal from generator 30 is supplied to a modulator 31. The signal is applied to the input conductor 4, coupled via the variable capacity formed by the rotor segments and the conductor 6, to the output conductor 6.

The variably attenuated signal of the output conductor is fed to a load circuit 32 such as a radar receiving scope. The scope would be of a radial trace type, the beam being angularly swept in synchronism with the rotor 3 as suggested by the dashed lines. It is apparent that by simply changing the rotor element 3 and substituting another of a different segment pattern, a different simulated antenna response may be obtained. Thus, there is practically no limit to the number of patterns which may be produced by the invention.

It should also be understood that while the disclosed embodiment of the invention has been shown as a series connected arrangement for a signal simulator, the invention may be utilized in any arrangement of series, parallel or combined series-parallel connected circuits so that a single signal may be simulated or a plurality of such signals may be simulated simultaneously.

Furthermore, while the conducting elements have been described as being printed on the dielectric base plate 1 and the rotor element 3, other forms of conductors may be employed.

While I have described above the principles of my inventon in connection with specific apparatus, it is to be clearly understood that this description is made only by way of example and not as a limitation of the scope of my invention as set forth in the objects thereof and in the accompanying claims.

What is claimed is:

1. A modulator for amplitude modulating radio frequency signals in accordance with a predetermined modulation pattern, said modulator comprising a discontinuous radio frequency transmission line having a signal input end and a signal output end and a discontinuity therein-between, a rotary disc member mounted adjacent to the discontinuity in said transmission line and journaled for rotation relative to said transmission line, a coupling capacitor element attached to said rotary disc member, said coupling capacitor element being adapted to capacitively couple radio frequency signals across said discontinuity in said transmission line, said coupling capacitor element containing a plurality of coplanar radially extending lobes each adapted to be aligned with said transmission line in a corresponding angular position of said rotary disc member, the dimensions and angular spacing of said lobes being adapted to vary the capacitance across said discontinuity according to a predetermined capacitance versus rotary disc angle function when said disc member is rotated, and said predetermined capacitance function being adapted to amplitude modulate radio frequency signals applied to the input end of said transmission line according to said predetermined modulation pattern when said disc member is rotated.

2. A modulator for amplitude modulating radio frequency signals in accordance with a predetermined modulation pattern, said modulator comprising a discontinuous radio frequency transmission line having a signal input end and a signal output end and a discontinuity therein-between, a first annular capacitor plate attached to one section of said transmission line at the discontinuity therein, a substantially linear capacitor plate attached to the other section of said transmission line adjacent to said first annular capacitor plate, a rotary disc member mounted over said first annular capacitor plate and journaled for rotation around an axis passing through the center of said first annular capacitor plate, said rotary disc member being large enough in diameter to cover said linear capacitor plate, a second annular capacitor plate mounted on said rotary disc member in alignment with said first annular capacitor plate, a plurality of capacitor plate lobes extending radially from said second annular capacitor plate, each of said capacitor plate lobes being adapted to be aligned with said substantially linear capacitor plate in a corresponding angular position of said rotary disc member, said capacitor plate and lobe members being positioned to form a coupling capacitor adapted to capacitively couple radio frequency signals across said discontinuity in said transmission line, the capacitance between said first and second annular capacitor plates being relatively constant with respect to the angular position of said rotary disc member and the capacitance between said second annular capacitor plate and said substantially linear capacitor plate being variable with respect to the angular position of said rotary disc member in accordance with the dimensions and angular spacing of said capacitor plate lobes, the dimensions and angular spacing of said capacitor plate lobes being adapted to vary the capacitance across said discontinuity according to a predetermined capacitance versus rotary disc angle function when said rotary disc member is rotated, and said predetermined capacitance function being adapted to amplitude modulate radio frequency signals applied to the input end of said transmission line according to said predetermined modulation pattern when said disc member is rotated.

3. A modulator as defined in claim 2 wherein said first annular capacitor plate and said substantially linear capacitor plate are mounted on a first surface of a first fixed insulator plate with said linear capacitor plate lying outside of said annular capacitor plate, and wherein said second annular capacitor plate and said capacitor plate lobes thereof are mounted on a first surface of a rotary insulator disc journaled for rotation about an axis passing through the center of said first annular capacitor plate, said fixed insulator plate and said rotary insulator disc being mounted with said first surfaces thereof adjacent to each other and separated by a relatively small air gap, and also including a second fixed insulator plate having an opening formed therein to receive and permit rotation of said rotary insulator disc, said second fixed insulator plate being attached to said first side of said first insulator plate substantially coplanar with said rotary insulator disc, and a first and second conductor plate attached to respective outer surfaces of said first and second fixed insulator plates to reduce radiation losses from said modulator.

4. A modulator as defined in claim 3 and also including a first shaft hole formed in said first insulator plate in the center of said first annular capacitor plate, a second shaft hole formed in said rotary insulator disc in the center of said second annular capacitor plate, a shaft coupling mounted on said rotary insulator disc adjacent to said second shaft hole, said shaft coupling being adapted to receive a shaft and to secure said shaft to said rotary insulator disc via said shaft coupling, a motor attached to the outer surface of said first fixed insulator plate with the drive shaft thereof extending through said first shaft hole thereof and projecting beyond said first surface thereof, and said rotary insulator disc being secured to said drive shaft by means of said shaft coupling.

5. A modulator for amplitude modulating radio frequency signals in accordance with a predetermined modulation pattern, said modulator comprising a first fixed capacitor plate, a second fixed capacitor plate adjacent to said first fixed capacitor plate, a rotatable capacitor plate capacitively coupling between said first and second fixed capacitor plates, said rotatable capacitor plate being journaled for rotation relative to said fixed capacitor plates, said rotatable capacitor plate being irregular in shape such that the capacitance between said first and second fixed capacitor plates varies as a function of the angular position of said rotatable capacitor plate, the shape of said rotatable capacitor plate being adapted to produce a capacitance versus rotary angle function corresponding to said predetermined modulation pattern, a radio frequency input terminal attached to said first fixed capacitor plate, a radio frequency output terminal attached to said second fixed capacitor plate, and said rotatable capacitor plate being adapted to be coupled to a rotary drive shaft.

6. A modulator as defined in claim 5 wherein said rotatable capacitor plate contains a plurality of coplanar radially extending capacitor plate lobes each adapted to be aligned between said first and second fixed capacitor plates in a corresponding angular position of said rotatable capacitor plate, the shape, length, and angular spacing of said capacitor plate lobes being adapted to produce a capacitance versus rotary angle function containing a plurality of maximum and minimum points for one full revolution of said rotatable capacitor, and wherein each maximum and minimum point of said capacitance function corresponds to a respective amplitude extreme on said predetermined modulation pattern.

7. A modulator as defined in claim 6 wherein said predetermined modulation pattern corresponds to the spatial response lobe pattern of a directional, rotatable radio frequency antenna having a major response lobe and a plurality of smaller side lobes, and wherein said rotatable capacitor plate contains a relatively large capacitor plate lobe corresponding to the major response lobe of said antenna and a plurality of smaller capacitor plate lobes each corresponding to a respective side lobe of said antenna, and wherein said capacitor plate lobes are angularly spaced in accordance with the angular spacing of said antenna response lobes.

8. A modulator for amplitude modulating radio frequency signals in accordance with a predetermined modulation pattern, said modulator comprising a fixed annular capacitor plate, a substantially linear fixed capacitor plate adjacent to and substantially coplanar with said fixed annular capacitor plate, a rotatable annular capacitor plate mounted in alignment with said fixed annular capacitor plate and journaled for rotation about an axis passing through the center thereof, the plane of said rotatable annular capacitor plate being substantially parallel to the plane of said fixed annular capacitor plate and separated therefrom by a relatively narrow dielectric gap, a plurality of capacitor plate lobes projecting radially from said rotatable annular capacitor, said capacitor plate lobes being substantially coplanar with said rotatable annular capacitor plate and each of said lobes being positioned so as to be aligned over said substantially linear fixed capacitor plate in a corresponding angular position of said rotatable annular capacitor plate, a radio frequency input terminal attached to one of said fixed capacitor plates, a radio frequency output terminal coupled to the other of said fixed capacitor plates, and the dimensions and angular spacing of said capacitor plate lobes being adapted to impose said predetermined modulation pattern on radio frequency signals applied to said radio frequency input terminal when said rotatable capacitor plate is rotated.

9. A modulator as defined in claim 8 wherein said predetermined modulation pattern corresponds to the spatial response pattern of a directional, rotatable radio frequency antenna and wherein each of said capacitor plate lobes corresponds in dimension and angular position to a corresponding response lobe of said spatial response pattern.

References Cited in the file of this patent
UNITED STATES PATENTS

| 2,751,689 | Jones et al. | June 26, 1956 |
| 2,779,106 | Harwood | Jan. 29, 1957 |